United States Patent
Morris et al.

(10) Patent No.: US 6,751,045 B1
(45) Date of Patent: Jun. 15, 2004

(54) COMPENSATION FOR REPEATABLE RUN-OUT ERROR

(75) Inventors: John Christopher Morris, Minneapolis, MN (US); Brian Robert Pollock, Eden Prairie, MN (US); Timothy Francis Ellis, Tonka Bay, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 959 days.

(21) Appl. No.: 09/481,422

(22) Filed: Jan. 12, 2000

Related U.S. Application Data

(62) Division of application No. 09/106,443, filed on Jun. 29, 1998, now Pat. No. 6,069,764.
(60) Provisional application No. 60/063,036, filed on Oct. 24, 1997.

(51) Int. Cl.[7] .............................................. G11B 5/596
(52) U.S. Cl. .................... 360/77.04; 360/75; 360/78.09
(58) Field of Search ............................... 360/77.04, 75, 360/78.09

(56) References Cited

U.S. PATENT DOCUMENTS

| | | | |
|---|---|---|---|
| 5,444,583 A | 8/1995 | Ehrlich et al. | 360/78.09 |
| 5,535,072 A | 7/1996 | Witt et al. | 360/99.06 |
| 5,539,714 A | 7/1996 | Andrews, Jr. et al. | 360/77.04 X |
| 5,550,685 A | 8/1996 | Drouin | 360/77.04 X |
| 5,608,586 A | 3/1997 | Sri-Jayantha et al. | 360/77.04 |
| 6,069,764 A * | 5/2000 | Morris et al. | 360/77.04 |

* cited by examiner

*Primary Examiner*—David Hudspeth
*Assistant Examiner*—Mitchell Slavitt
(74) *Attorney, Agent, or Firm*—Theodore M. Magee; Westman, Champlin & Kelly, P.A.

(57) ABSTRACT

A method and apparatus for compensating for repeatable run-out errors in a disc drive is disclosed. The compensation is created by determining transfer function values for a servo loop in the drive as well as a sequence of repeatable run-out values for a portion of a disc. The repeatable run-out values are divided by respective transfer function values to produce compensation values that are inverse transformed to produce time-domain compensation values. These time-domain compensation values are injected into the servo loop to compensate for repeatable run-out errors.

1 Claim, 7 Drawing Sheets

COMPENSATION FOR REPEATABLE RUN-OUT ERROR

REFERENCES TO RELATED APPLICATION

This application claims priority benefits from a U.S. provisional application having serial No. 60/063,036, entitled COMPENSATION FOR WRITTEN-IN ERROR IN A DISC DRIVE USING AN EMBEDDED SERVO, and filed on Oct. 24, 1997.

This application is a divisional of an U.S. Utility Application having Ser. No. 09/106,443, filed on Jun. 29, 1998 now U.S. Pat. No. 6,069,764 and entitled COMPENSATION FOR REPEATABLE RUN-OUT ERROR.

FIELD OF THE INVENTION

The present invention relates to servo systems in disc drives. In particular, the present invention relates to compensation for errors in servo systems.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position.

Ideally, a head following the center of a track moves along a perfectly circular path around the disc. However, two types of errors prevent heads from following this ideal path. The first type of error is a written-in error that arises during the creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as a track following error. Track following errors arise as a head attempts to follow the path defined by the servo fields. The track following errors can be caused by the same aerodynamic and vibrational effects that create written-in errors. In addition, track following errors can arise because the servo system is unable to respond fast enough to high frequency changes in the path defined by the servo fields.

Written-in errors are often referred to as repeatable run-out errors because they cause the same errors each time the head passes along a track. As track densities increase, these repeatable run-out errors begin to limit the track pitch. Specifically, variations between the ideal track path and the actual track path created by the servo fields can result in an inner track path that interferes with an outer track path. This is especially acute when a first written-in error causes a head to be outside of an inner track's ideal circular path and a second written-in error causes the head to be inside of an outer track's ideal circular path. To avoid limitations on the track pitch, a system is needed to compensate for repeatable run-out errors.

The present invention addresses these and other problems, and offers other advantages over the prior art.

SUMMARY OF THE INVENTION

A method and apparatus for compensating for repeatable run-out errors in a disc drive is disclosed. The compensation is created by determining transfer function values for a servo loop in the drive as well as a sequence of repeatable run-out values for a portion of a disc. The repeatable run-out values are divided by respective transfer function values to produce compensation values that are inverse transformed to produce time-domain compensation values. These time-domain compensation values are injected into the servo loop to compensate for repeatable run-out errors.

DETAILED DESCRIPTION OF THE PREFERRED EMBODIMENTS

Figure 1:
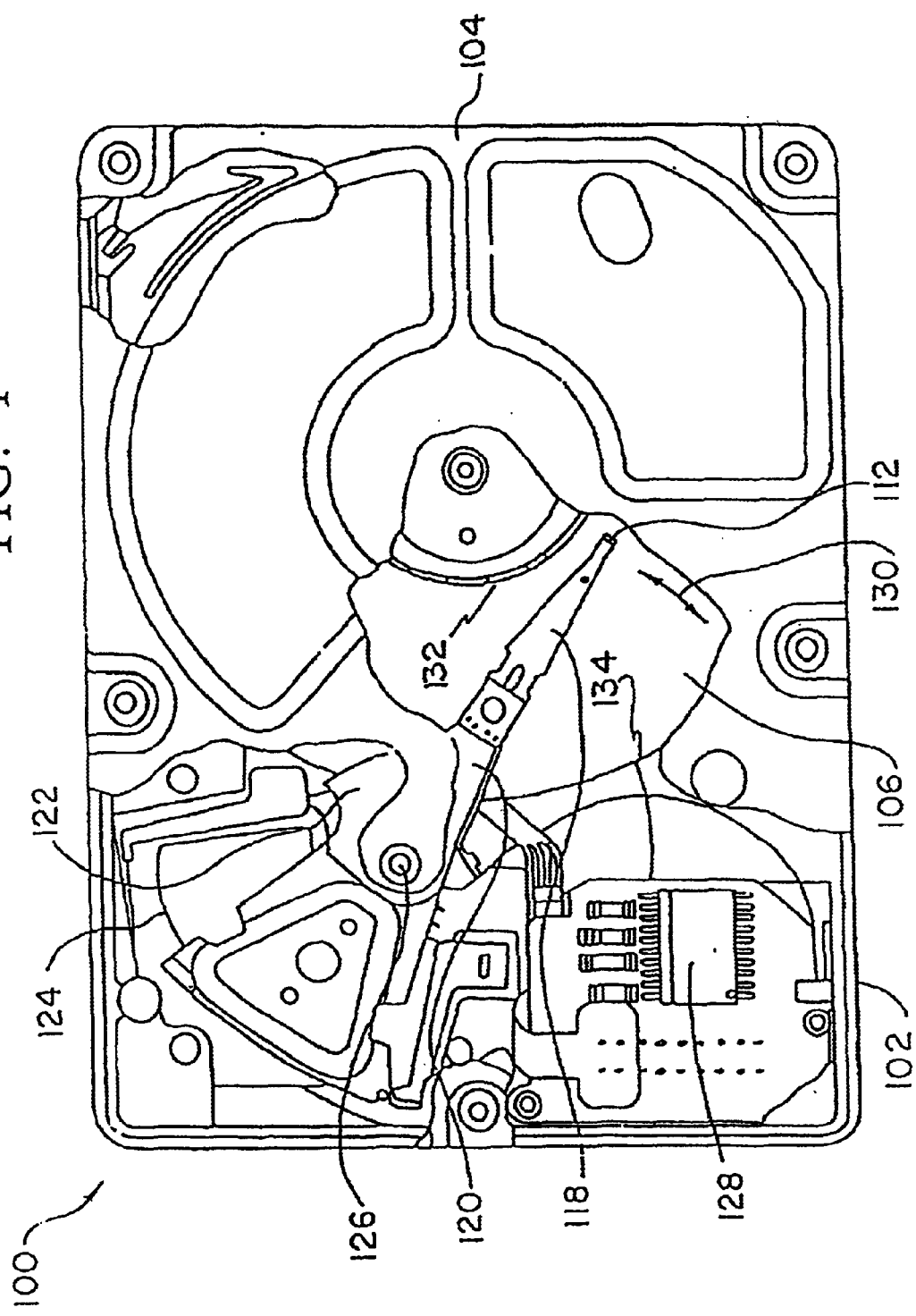
FIG. 1 is a plan view of a disc drive of the present invention.

FIG. 1 is a plan view of a disc drive 100 that includes a housing with a base plate 102 and a top cover 104 (sections of top cover 104 are removed for clarity). Disc drive 100 further includes a disc pack 106, which is mounted on a spindle motor (not shown). Disc pack 106 can include a plurality of individual discs which are mounted for co-rotation about a central axis. Each disc surface has an associated head gimbal assembly (HGA) 112 which is mounted to disc drive 100 for communication with the disc surface. Each HGA 112 includes a gimbal and a slider, which carries one or more read and write heads. Each HGA 112 is supported by a suspension 118 which is in turn attached to a track accessing arm 120 known generally as a fixture, of an actuator assembly 122.

Actuator assembly 122 is rotated about a shaft 126 by a voice coil motor 124, which is controlled by servo control circuitry within internal circuit 128. HGA 112 travels in an arcuate path 130 between a disc inner diameter 132 and a disc outer diameter 134. When the head is properly positioned, write circuity within internal circuitry 128 encodes data for storage on the disc and sends an encoded signal to the head in HGA 112, which writes the information to the disc. At other times, the read head in HGA 112 reads stored information from the disc and provides a recovered signal to detector circuitry and decoder circuitry within internal circuitry 128 to produce a recovered data signal.

Figure 2:
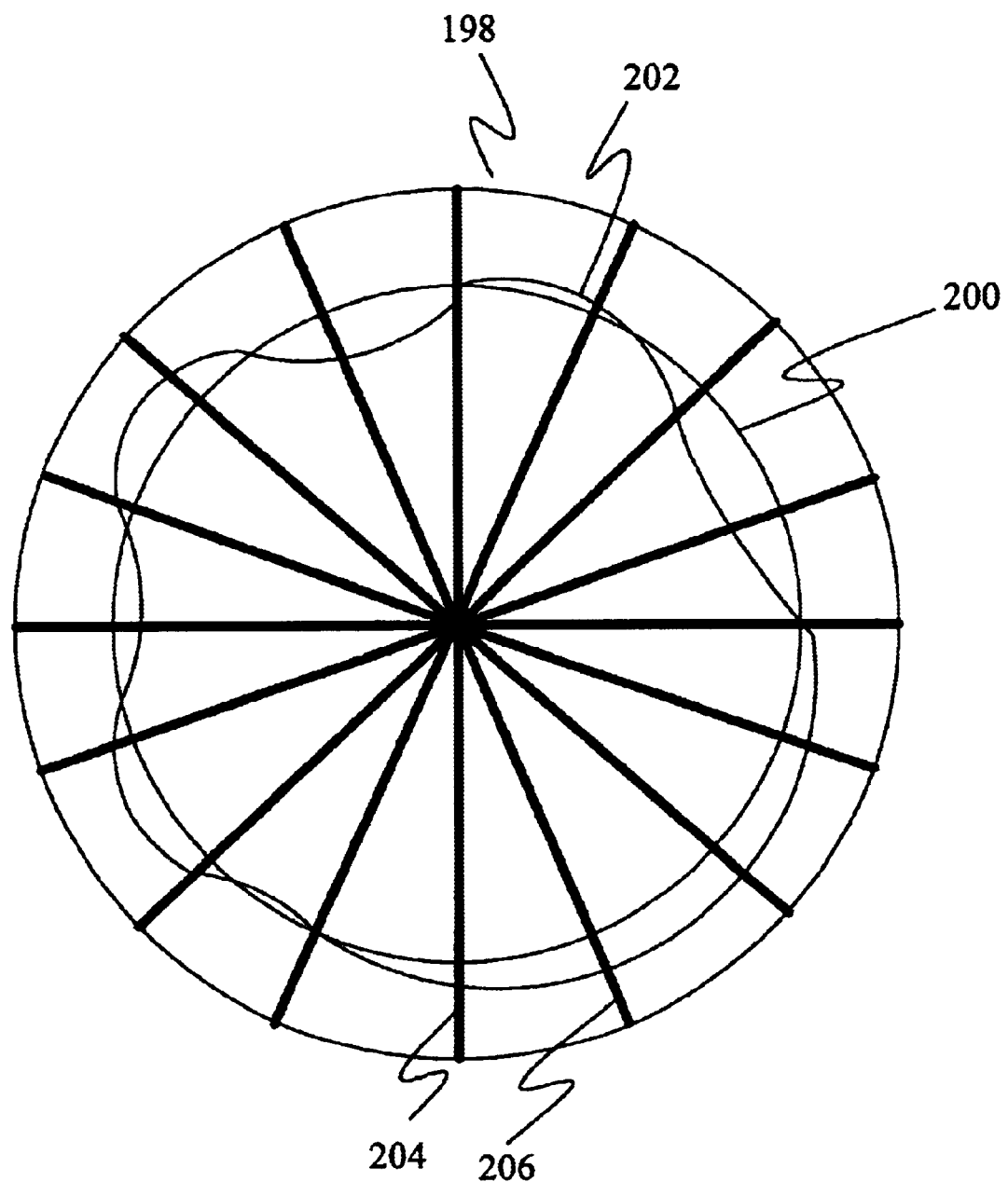
FIG. 2 is a top view of a section of a disc showing an ideal track and a realized written-in track.

FIG. 2 is a top view of a section 198 of a disc showing an ideal, perfectly circular track 200 and an actual track 202. Section 198 includes a plurality of radially extending servo fields such as servo fields 204 and 206. The servo fields include servo information that identifies the location of actual track 202 along disc section 198.

Any variation in the position of a head away from circular track 200 is considered a position error. The portions of track 202 that do not follow circular track 200 create written-in repeatable run-out position errors. A position error is considered a repeatable run-out error if the same error occurs each time the head passes a particular circumferential location on the disc. Track 202 creates a repeatable run-out error because each time a head follows the servo fields that define track 202, it produces the same position error relative to ideal track 200.

Under the present invention, a head attempting to write to or read from track 202 will not follow track 202 but instead will more closely follow perfectly circular track 200. This is accomplished using a compensation signal that prevents the servo system from tracking repeatable run-out errors resulting from the irregular shape of track 202.

Figure 3:
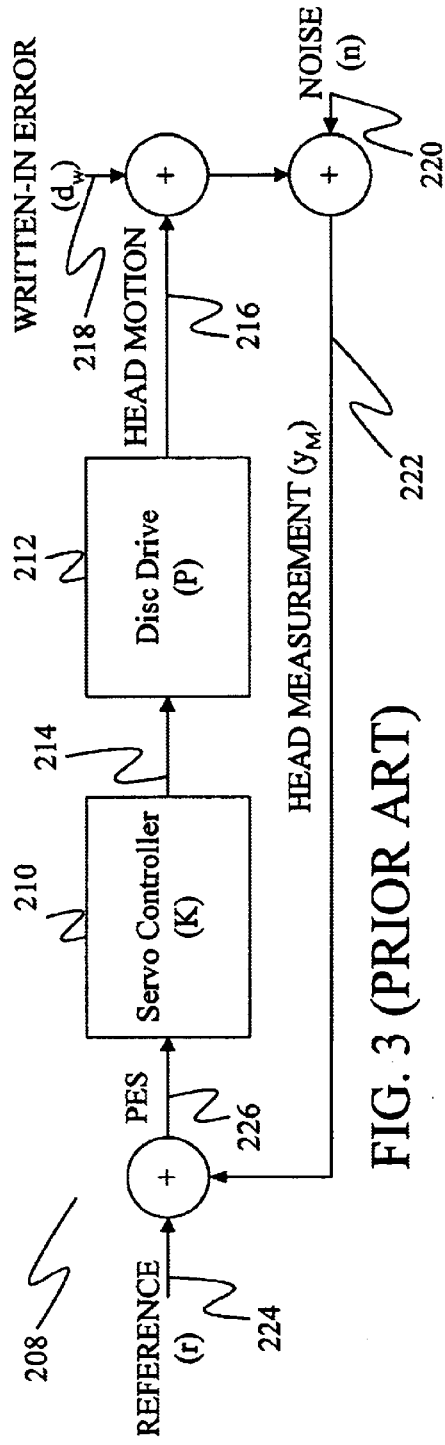
FIG. 3 is a block diagram of a prior art servo loop.

FIG. 3 is a block diagram of a servo loop 208 of the prior art. The servo loop includes a servo controller 210, having a gain of "K" and a disc drive 212 having a gain of "P". Servo controller 210 is the servo control circuitry within internal circuit 128 of FIG. 1. Disc drive 212 includes actuator assembly 122, voice coil motor 124, track accessing arm 120, suspension 118, and head gimbal assembly 112, all of FIG. 1.

Servo controller 210 generates a control current 214 that drives the voice coil motor of disc drive 212. In response, disc drive 212 produces head motion 216. In FIG. 3, the written-in error, $d_w$, is represented as a separate input signal 218 even though the written-in error would otherwise appear implicitly in head motion 216. The separation of written-in error 218 from head motion 216 provides a better understanding of the present invention. In addition, noise in the servo system has been separated and appears as noise 220, which is added to the head motion. The sum of head motion 216, written-in error 218 and noise 220 results in the head's servo measurement signal 222. Servo measurement signal 222 is subtracted from a reference signal 224, which is generated by internal circuitry 128 based on a desired location for the head. Subtracting head measurement 222 from reference signal 224 produces position error signal 226 which is input to servo controller 210.

The servo loop of FIG. 3 has a closed loop response that is calculated as:

$$y = \frac{PK}{1+PK}(r - n - d_w) \quad \text{Equation 1}$$

where "y" is head motion 216, "P" is the gain of disc drive 212, "K" is the gain of servo controller 210, "r" is reference signal 224, "n" is noise signal 220, and "$d_w$" is the written-in error.

From Equation 1, it is clear that heads in servo loops of the prior art move in response to written-in errors. This movement is undesirable since it places the head outside of the ideally circular track path. Further, because the transfer function, PK/(1+PK), is frequency dependent, the transfer function suffers from peaking at certain frequencies. This peaking causes even greater position errors because it amplifies the written-in error at certain frequencies.

An alternative description of the response of the closed loop system of FIG. 3 is:

$$PES = \frac{1}{1+PK}(r - n - d_w) \quad \text{Equation 2}$$

where PES is PES signal 226 of FIG. 3. Using Equation 2, an estimation of $d_w$ can be produced by ignoring reference signal 224 and noise signal 220 and only using the portions of position error signal 226 that are caused by repeatable run-out error. This results in:

$$d_w = \frac{R}{\frac{1}{(1+PK)}} \quad \text{Equation 3}$$

where R is the repeatable run-out portion of position error signal 226.

Figure 4:
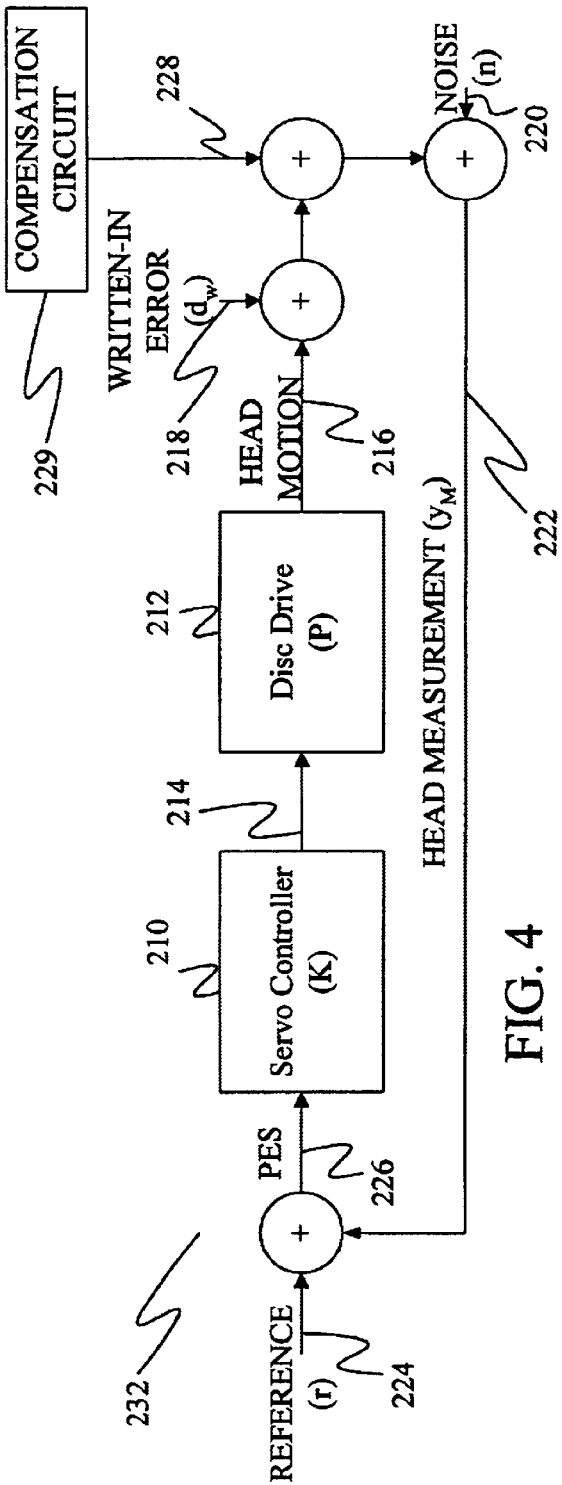
FIG. 4 is a block diagram of a servo loop of the present invention.

To eliminate the unwanted head motion created by the written-in error, the present invention adds a compensation signal to the servo loop of the prior art. This added signal is shown in servo loop 232 of the present invention, which is shown in FIG. 4. In FIG. 4, the elements that are common to FIG. 3 are numbered the same. The compensation signal added to the servo loop is compensation signal 228, which is produced by compensation circuitry 229. In FIG. 4, compensation signal 228 is inserted after the summation of written-in error 218 and head motion 216. However, those skilled in the art will recognize that the compensation signal can be added at other locations within the servo loop.

With the addition of compensation signal 228, the closed loop response of servo loop 232 is expressed as:

$$y = \frac{PK}{1+PK}(r - n - d_w - d_c) \quad \text{Equation 4}$$

where $d_c$ is compensation signal 228. From Equation 4, it is apparent that the effects of written-in error, $d_w$, will be eliminated by compensation signal, $d_c$, if the compensation signal is equal to the negative of the written-in error.

Using equations 3 and 4 above, an estimation of the compensation signal, $d_c$, needed to eliminate the effects of written-in error, $d_w$, appears as:

$$d_c = \frac{R}{\frac{1}{(1+PK)}} \quad \text{Equation 5}$$

where R is the repeatable run-out component of the position error measurement.

In terms of frequencies, Equation 5 can be described as:

$$d_c(j\omega) = \frac{R(j\omega)}{\frac{1}{(1+PK)}(j\omega)} \qquad \text{Equation 6}$$

Figure 5:
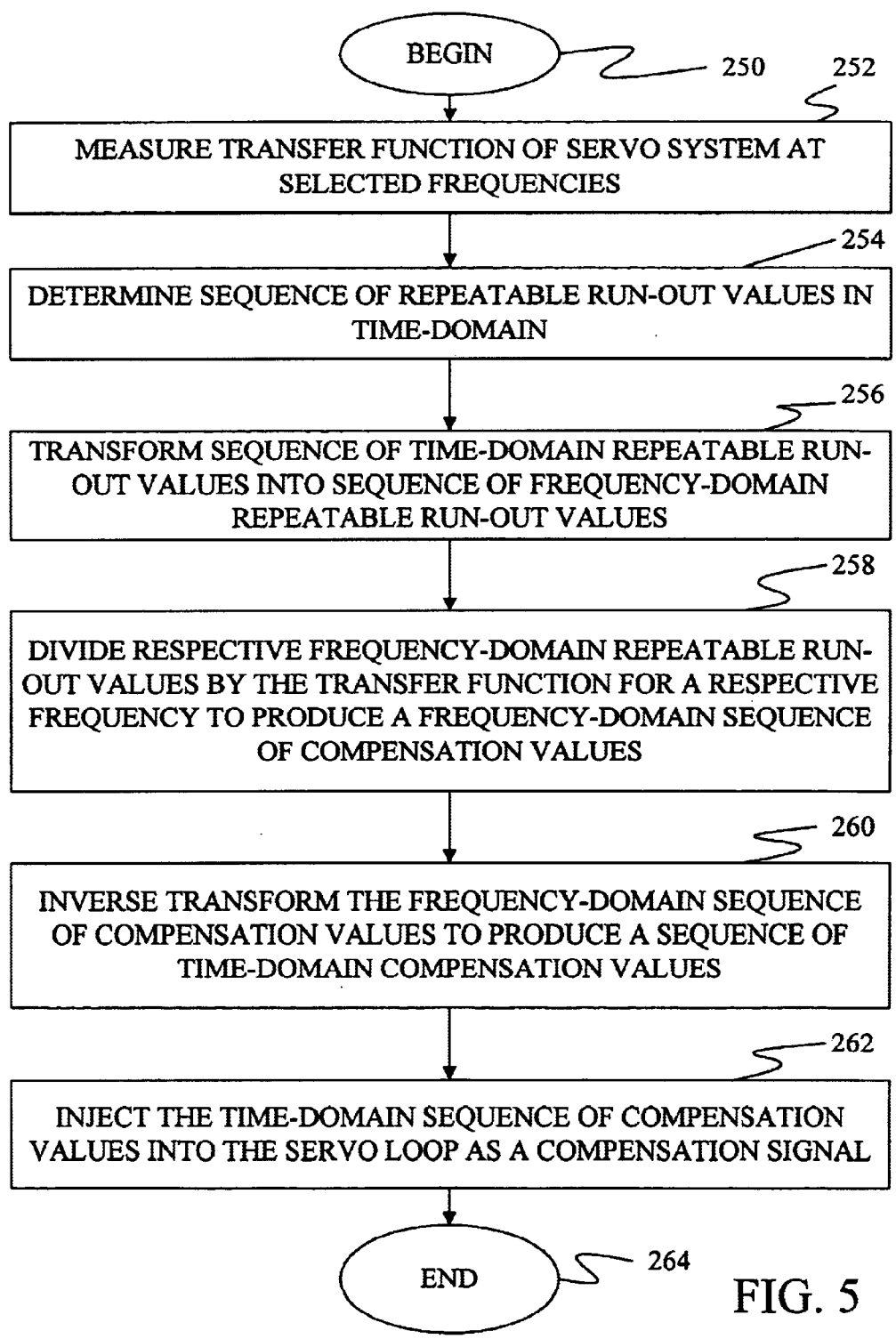
FIG. 5 is a flow diagram showing a non-iterative embodiment of the present invention.

The compensation signal injected into the servo loop of the present invention is a time-domain signal. Preferably, this time-domain signal is determined using the frequency domain relationship shown in Equation 6 to produce a frequency-domain compensation signal and transforming the resulting frequency-domain compensation signal into a time-domain compensation signal. The method of the present invention for determining the time-domain compensation signal is shown in FIG. 5.

The method begins at state 250 and proceeds to state 252 where the transfer function of the servo system is measured at selected frequencies. The transfer function measured in state 252 is 1/(1+PK) (j). This transfer function can be measured using known techniques, which are described in "Discrete Time Control" by Franklin, Paul & Workman. Essentially, these techniques inject a disturbance into the servo system and measure a resulting signal within the servo system. The ratio of the injected signal to the measured signal provides the transfer function.

The transfer function measured in state 252 is only measured at selected frequencies. The selected frequencies are integral harmonics of the spindle frequency. The reason that the transfer function is only measured at the integral harmonics of the spindle frequency is that the repeatable run-out component of the position error measurement only has frequency components that are integral harmonics of the spindle frequency. This occurs because the repeatable run-out error is only measured at the servo fields, and the servo fields are equally spaced around the disc.

Thus, the lowest frequency that appears in the repeatable run-out signal is equal to the spindle frequency itself, and the highest frequency is equal to the spindle frequency times one-half the number of servo fields along a track.

As those skilled in the art will recognize, the transfer function only needs to be measured for those frequencies that are integral harmonics of the spindle frequency between the spindle frequency and one-half the number of servo fields on the disc times the spindle frequency. This upper frequency is known as the Nyquist frequency.

Once the transfer function has been measured at the selected frequencies, the method continues at state 254 where a time-domain sequence of repeatable run-out values is determined for a track. The repeatable run-out values can be calculated by repeatedly following the track over a number of revolutions, V, and averaging the position error signal obtained at each servo field over all of the revolutions. This is described by the following equation:

$$R(k) = \frac{1}{V}\sum_{i=1}^{V} PES[k+(i-1)\cdot N] \qquad \text{Equation 7}$$

where R(k) is a sequence of time-domain repeatable run-out values, V is the number of revolutions, N is the number of servo fields along a track, and PES[k+(i−1)N] is the position error signal generated at the $k^{th}$ servo field at each $i^{th}$ revolution.

Thus, at each revolution, the position error signal for each servo field is recorded. The recorded position error signals for a particular servo field are then summed together and divided by the number of revolutions. This is repeated for each servo field resulting in a sequence of repeatable run-out values comprising one repeatable run-out error for each servo field. This sequence of repeatable run-out values is represented by R(k).

After state 254, the method continues at state 256, where the sequence of time-domain repeatable run-out values created in state 254 is transformed into a sequence of frequency-domain repeatable run-out values, R(j). Preferably, the time-domain sequence of repeatable run-out values is transformed using a Fast Fourier Transform (FFT). This results in a sequence of frequency-domain repeatable run-out values that includes a value for each of the integral harmonics of the spindle frequency between the spindle frequency and one-half the number of servo fields times the spindle frequency.

In state 258, the respective frequency-domain repeatable run-out values are divided by the value of the servo loop's transfer function at the respective frequencies. This provides a sequence of frequency-domain compensation values. For example, the repeatable run-out value associated with the spindle frequency is divided by the value of the transfer function at the spindle frequency to produce a compensation value at the spindle frequency. Similarly, the repeatable run-out value at twice the spindle frequency is divided by the value of the transfer function at twice the spindle frequency to produce a compensation value at twice the spindle frequency, and so forth. This process is described by the equation:

$$d_c(j\omega) = \frac{R(j\omega)}{\frac{1}{1+PK}(j\omega)}, \; \omega = m\cdot(2\pi f_s), m = 1,\ldots,\frac{N}{2} \qquad \text{Equation 8}$$

where $f_s$ is the spindle frequency, m is a harmonics integer, and N is the number of servo burst fields around a circumferential track.

Once the frequency-domain compensation values have been produced in state 258, the method continues in state 260 where an inverse transform of the frequency-domain compensation values is taken to produce a sequence of time-domain compensation values, having one compensation value for each of the servo fields. Preferably, this inverse transform is an inverse Fast Fourier Transform.

In state 262, the time-domain sequence of compensation values is injected into the servo loop as a compensation signal, and the method ends at state 264.

Except for the step of measuring the transfer function of the servo system, the method described in FIG. 5 is preferably repeated for each track on the disc. The transfer function of the servo system may be measured as little as once for the method or may be measured at an inner track, a middle track and an outer track. If more than one transfer function is measured, the transfer function associated with a track that is closest to the track currently being examined is used in the computations of the compensation values for the track. In addition, a separate transfer function may be measured for each head.

The quality of the compensation value produced through the method of FIG. 5 is dependent upon the number of revolutions used to determine the repeatable run-out values in state 254. As the number of revolutions increases, the accuracy of the repeatable run-out values improves. However, each revolution increases the time required to build the disc drive and thus should be minimized if possible. Preferably, the number of revolutions should be kept at five or fewer revolutions per track.

Figure 6:
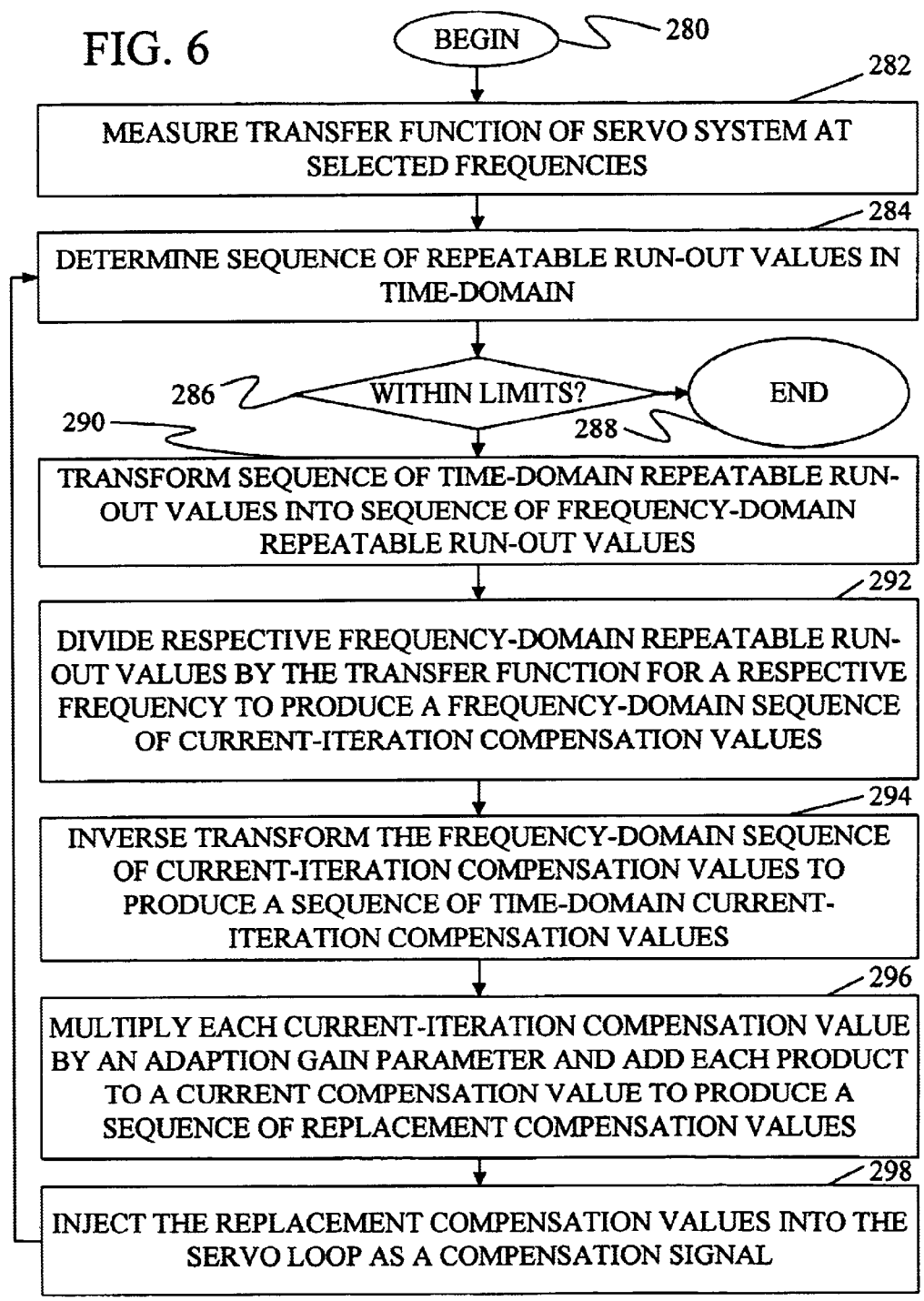
FIG. 6 is a flow diagram showing an iterative embodiment of the present invention.

To accommodate a lower number of revolutions, one embodiment of the present invention utilizes an iterative process. Such an iterative process is shown in FIG. 6. The method of FIG. 6 starts at state 280 and continues at state 282 where the transfer function is measured at discrete harmonic frequencies between the spindle frequency and one-half the number of servo fields times the spindle frequency.

A time-domain sequence of repeatable run-out values is then determined in state 284 using Equation 7 above. Preferably the number of revolutions used to determine the repeatable run-out values is equal to five.

In state 286, the repeatable run-out values are compared against a limit for repeatable run-out values and if the repeatable run-out values are below the limit, the process ends at state 288.

If the time-domain repeatable run-out values are above the desired limits for the disc drive, they are transformed into a sequence of frequency-domain repeatable run-out values in state 290. Preferably, the transform is performed using a Fast Fourier Transform that results in repeatable run-out values for a set of discrete frequencies consisting of integer harmonics of the spindle frequency between the spindle frequency and one-half the number of servo fields times the spindle frequency.

In state 292, each of the frequency-domain repeatable run-out values is divided by the values of the transfer function at the frequencies of the respective run-out values using equation 8 above. These divisions produce a sequence of frequency-domain current-iteration compensation values. Thus, the repeatable run-out value associated with the spindle frequency is divided by the value of the transfer function at the spindle frequency to produce a current-iteration compensation value at the spindle frequency. Similarly, the repeatable run-out value at four times the spindle frequency is divided by the value of the transfer function at four times the spindle frequency to produce a current-iteration compensation value at four times the spindle frequency.

In state 294, the inverse transform of the frequency-domain current-iteration compensation values is taken to produce a sequence of time-domain current-iteration compensation values. Preferably, this inverse transform is an inverse Fast Fourier Transform that results in one compensation for each servo field.

In state 296, each current-iteration compensation value is multiplied by an adaption gain parameter to produce a sequence of incremental values. The incremental values represent changes to be made to the compensation values currently being used by the servo loop. These current compensation values are added to the incremental values to produce a sequence of replacement compensation values to be used by the servo loop in the next iteration. On the first pass through the iteration of FIG. 6 the current compensation value at each servo field is equal to zero.

The adaption gain parameter discussed in state 296 has a value between zero and one. This means that only a fraction of the derived compensation value is used to adjust the compensation value used by the servo loop. This causes the servo loop's compensation value to increase in a controlled manner until it reaches the value that provides repeatable run-out values within the limits set within state 286.

In state 298, the new compensation values created in state 296 are injected into the servo loop as a compensation signal and control is returned to state 284. Steps 284, 286, 290, 292, 294, 296 and 298 repeat such that the compensation values grow until they reach values that cause the repeatable run-out values to be within the limits set by state 286.

Figure 7:
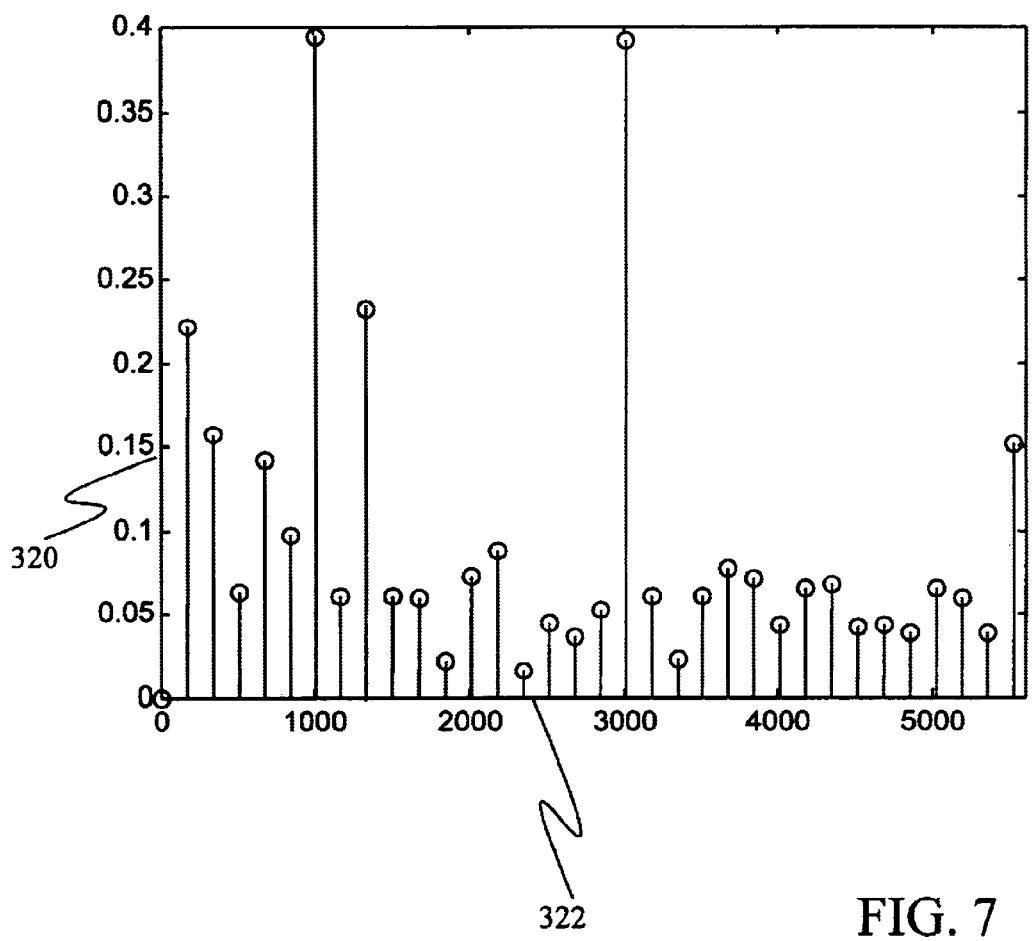
FIG. 7 is a graph of frequency-domain compensation values obtained under the present invention.

FIG. 7 is a graph of compensation values as a function of frequency produced using the present invention. The magnitude of the compensation values is shown in microinches on vertical axis 320 and the frequency of the compensation values is shown in Hertz on horizontal axis 322. At each harmonic of the spindle frequency there is a compensation value represented by an open circle.

Figure 8:
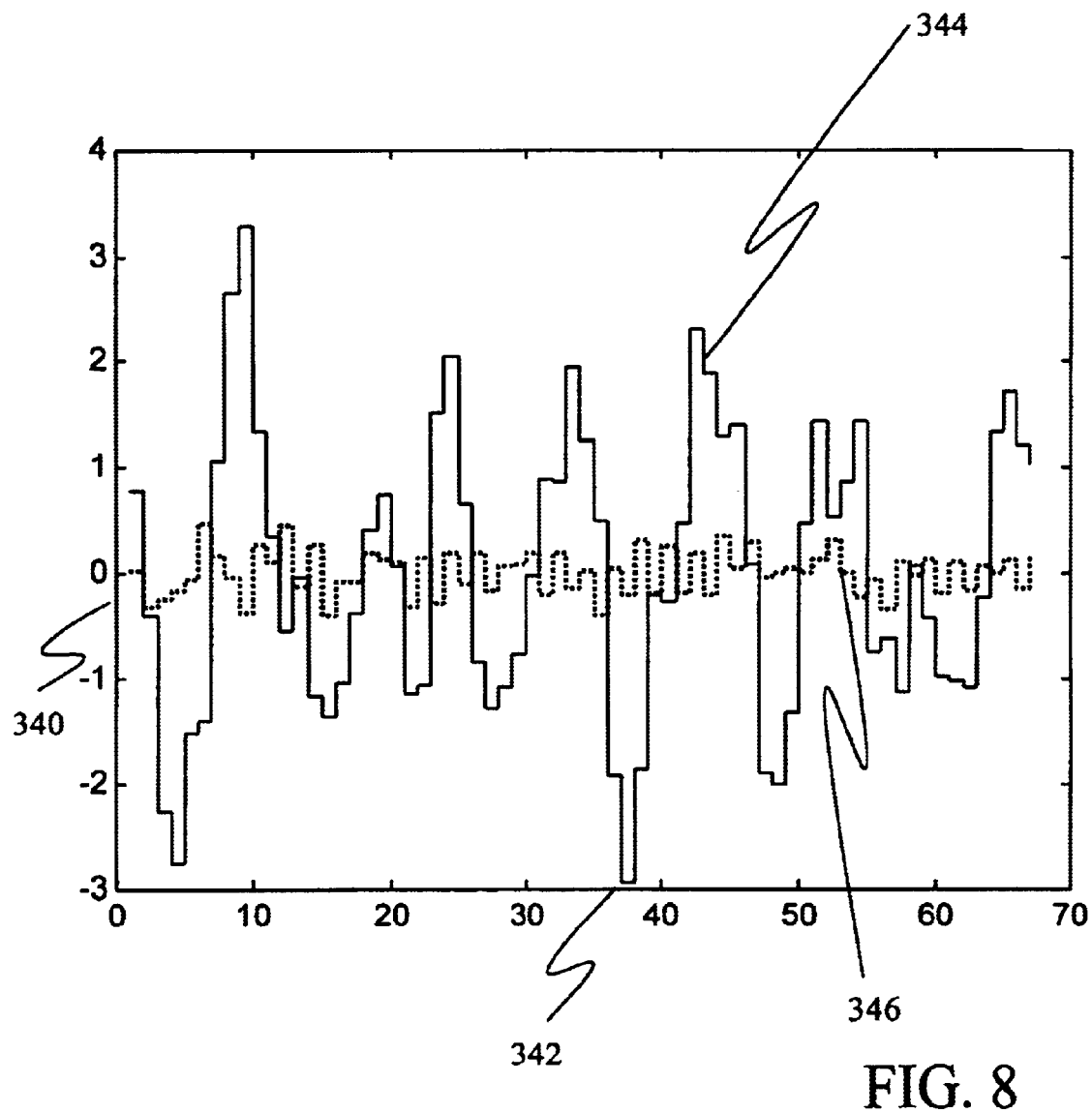
FIG. 8 is a graph of repeatable run-out errors for an uncompensated servo system and a compensated servo system of the present invention.

FIG. 8 provides graphs of repeatable run-out error with and without the compensation signal of the present invention. In FIG. 8, the magnitude of the repeatable run-out error is shown in microinches on vertical axis 340 and time is shown on horizontal axis 342. Graph 344 of FIG. 8 shows the repeatable run-out error in a servo system that does not use the compensation signal of the present invention. Graph 346 shows the repeatable run-out error for a servo system that uses a compensation signal of the present invention.

In summary, a method of compensating repeatable run-out errors in a disc drive includes a state 252 of determining a transfer function for a servo loop in the disc drive and states 254, 256 of determining a sequence of repeatable run-out values for a portion of the disc drive. It also includes a state 258 of dividing each repeatable run-out value by a respective transfer function value to produce a sequence of compensation values. In a state 260, an inverse transform is applied to the sequence of compensation values to produce a sequence of time-domain compensation values and in a state 262, the sequence of time-domain compensation values is injected into the servo loop.

In further embodiments of the present invention, compensated repeatable run-out values are determined in states 284, 290 after injecting a refined sequence of compensation values in a state 298. If a compensated repeatable run-out value exceeds an acceptable repeatable run-out limit in a state 286, the refined compensation values are replaced in states 292, 294, 296, and 298. In state 292, compensated repeatable run-out values are divided by respective transfer function values to produce current-iteration compensation values. An inverse transform is applied to the current-iteration compensation values to produce time-domain current-iteration compensation values in a state 294. These time-domain current-iteration compensation values are arithmetically combined with refined compensation values in state 296 to form replacement compensation values that replace the refined compensation values in a state 298.

In a disc drive of the present invention a servo loop includes a servo controller 210, an actuator 122, a head 112 and a sensor located in the head. The servo loop of the present invention also includes a compensation circuit 229 for injecting a compensation signal 228, where the compensation signal is formed from initial compensation values created by determining a sequence of repeatable run-out values in a state 254, transforming the sequence of repeatable run-out values into a sequence of frequency-domain repeatable run-out values in a state 256 and dividing each frequency domain repeatable run-out value by a respective transfer function value of the servo loop in a state 258. This produces a sequence of frequency-domain compensation values that are inverse transformed in a state 260 to produce the initial time-domain compensation values that are used to create the compensation signal 228.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. In addition, although the preferred embodiment described herein is directed to a servo loop for a disc drive system, it will be appreciated by those skilled in the art that the teachings of the present invention can be applied to other systems, without departing from the scope and spirit of the present invention.

What is claimed is:

1. A disc drive comprising:

a servo loop including a head and a servo controller capable of controlling the location of the head; and compensation means coupled to the servo loop for compensating for repeatable run-out.

\* \* \* \* \*

UNITED STATES PATENT AND TRADEMARK OFFICE
CERTIFICATE OF CORRECTION

PATENT NO. : 6,751,045 B1
DATED : June 15, 2004
INVENTOR(S) : Morris et al.

It is certified that error appears in the above-identified patent and that said Letters Patent is hereby corrected as shown below:

<u>Column 4,</u>
Lines 22-24, Equation 3, "$d_w = \dfrac{R}{\dfrac{1}{(1+PK)}}$" should be -- $d_w = -\dfrac{R}{\dfrac{1}{(1+PK)}}$ --

Signed and Sealed this

Third Day of May, 2005

JON W. DUDAS
*Director of the United States Patent and Trademark Office*